Sept. 26, 1961 H. HURVITZ 3,001,539

SUCTION AMPLIFIER

Filed Aug. 15, 1960

INVENTOR

HYMAN HURVITZ

BY Hurvitz & Rose

ATTORNEY

United States Patent Office 3,001,539 Patented Sept. 26, 1961

3,001,539

SUCTION AMPLIFIER

Hyman Hurvitz, 1313 Juniper St. NW., Washington, D.C.

Filed Aug. 15, 1960, Ser. No. 49,752
21 Claims. (Cl. 137—83)

The present invention relates generally to fluid amplifiers of the type which utilize no moving parts, and more particularly to fluid amplifiers which utilize differential pressure against the side of an elongated main fluid stream of fluid to control the direction of the stream.

Fluid amplifiers having no moving parts except the fluid itself are well known in the prior art. Such amplifiers are of various types. One such type is known as the stream interaction or momentum interchange type. In such an amplifier a power nozzle is supplied with pressurized fluid and issues a power jet or stream. A control nozzle directs fluid against the side of the power jet and deflects the power jet away from the control nozzle. Momentum is conserved in the system and the power jet will therefore flow at an angle with respect to its original direction such that the tangent of this angle is a function of the momentum of the control stream and the momentum of the power stream. It is thus possible to direct a high powered jet toward or away from a target area in response to a control stream of lower power.

A further type of fluid amplifier is known as the boundary layer fluid amplifier. Boundary layer fluid amplifiers direct high energy power jets directly toward a target area or receiving tube system, by pressure distribution in a power jet boundary layer region. This pressure distribution is controlled by the wall configuration of an interaction chamber, i.e., a chamber in which the power jet and control jets interact, as well as by power jet energy level, fluid transport effects, back-loading of the amplifier outputs, and the flow of control fluid through the power jet boundary layer region. In a boundary layer control fluid amplifier having two side walls on either side of a power jet, special design of the interaction chamber configuration assures that the power jet will lock on to one side wall, and remain in lock-on configuration even without control fluid flow. When the power jet is suitably deflected toward one side wall by a control fluid jet it can lock on to that side wall and remain in that locked on configuration even after flow of the control fluid is terminated. The unit thus possess inherent positive feed-back by virtue of the lock-on configuration of the interaction chamber, and the feed-back path is created and destroyed in accordance with the position of the power jet. In essence this implies that power jets of prior art devices may be deflected to one side or the other side of the interaction chamber in response to a pulse of control jet pressure, and having been so deflected will remain in deflected position, by virtue of boundary layer lock on, until that position is disturbed by the application of sufficient pressure to an appropriate control jet which overcomes the lock on and deflects the power jet toward the other side of the chamber.

The present invention concerns itself with a type of fluid amplifier utilizing no moving parts, in which boundary layer lock-on effects are employed by controlled reduction of pressure in a boundary layer lock-on region, rather than by a control jet, this reduction being effected by means of a channel communicating between the boundary layer interaction region and a region of lower pressure that exists in the power stream itself. An effect analogous to boundary layer control can also be achieved without any special configuration of the chamber walls, by utilizing a controlled exhaustion port at selected positions along the path of fluid flow. The controlled exhaustion port then replaces the boundary layer region, having a similar effect in that it introduces a region of low pressure adjacent to one side of the power stream. Egress of fluid may be controlled either in response to electrical signals, as by means of electro-fluid resistances, or by means of flapper valves.

The present invention also concerns itself with a modification of the momentum interchange amplifier, in which fluid from the main stream is controllably evacuated through egress control passages to create a transverse pressure gradient across the stream. Control of the transverse pressure gradient is effected either by flapper valves or electro-fluid resistances, whereby any necessity for momentum interchange in response to a control jet is eliminated, the pressure adjacent to the main jet itself being utilized to control the activity of the main jet when a low pressure region is created on one or the other side of the main jet.

It is accordingly a broad object of the present invention to provide novel types of fluid amplifiers requiring no moving parts.

It is another object of the invention to provide a system of fluid amplification employing controlled boundary layer effects, wherein the boundary layer pressures are reduced below that which is induced by the fluid stream itself.

It is another object of the invention to provide quasi-boundary layer control systems, in which low pressures heretofore generated by boundary layer effects are introduced by fluid egress passages having controllable resistance.

Another object of the invention resides in the provision of a system for controlling the direction of flow of a main fluid stream by providing controlled egress of fluid to a region of relatively low pressure, the controlled egress occurring transversely of the direction of the main stream.

Still another object of the invention is to provide a novel system for controlling fluid flow in response to flapper valves wherein the control effects of the flapper valves are amplified.

Another object of the invention is to provide a replacement for a flapper valve control system, wherein the effect of a flapper valve is attained by means of an electro fluid resistance.

The above and still further objects, features and advantages of the present invention will become apparent upon consideration of the following detailed description of one specific embodiment thereof, especially when taken in conjunction with the accompanying drawings, wherein:

FIGURE 4 is a modification of the system of FIGURE 3 wherein specially shaped boundary layer regions are dispensed with.

Figure 1:
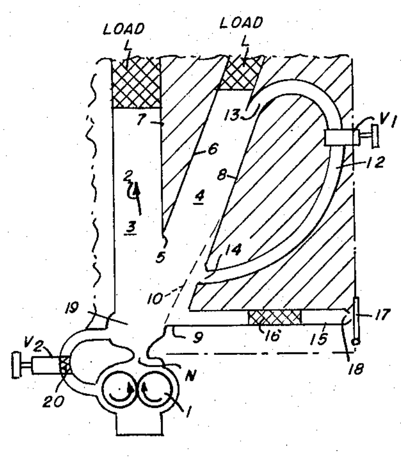
FIGURE 1 is a diagrammatic showing of a boundary layer fluid amplifier employing a nozzle valve controlled egress passage communicating with a boundary layer control region.

Referring now more particularly to the accompanying drawings, the reference numeral 1 denotes a pump which ejects gas (or other fluid) in the direction of the arrow 2, along the passageway 3 via a nozzle N. A branching passageway 4 is provided which communicates with the passageway 3 at a point 5 at a small angle, say 20°. One wall of the passageway 4, i.e. the wall 6 makes a sharp angle with a corresponding wall 7 of the passageway 3, while the other wall 8 of the passageway 4 joins the passageway 3 via an offset 9. The region adjacent the offset 9, and specifically the region 10 under the dash lines, may be termed a boundary layer control region. The rationale of this term is that when fluid passes along the passageway 4 in a stream, fluid present in the region 10 is entrained by the stream of fluid, resulting in generation of low pressure in the region 10. This relatively low pressure region, being on the side of the main stream passing along the passageway 4 adjacent wall 8, tends to deflect the main stream toward the wall 8 and to lock the latter against the wall 8. It therefore provides positive feed back. Provision of a boundary layer region such as 10 in fluid amplifiers, to provide positive feed-back, is per se old.

A negative feed-back path is provided in the form of a channel 12 having an origin 13 communicating with the up stream side of the channel 4 and having an egress 11 communicating with the boundary layer region 10. As fluid flows along the passage 4, some of the fluid is diverted into the channel 12, and is applied to the region 10, where it increases the pressure there normally present, and thereby tends to prevent or break boundary layer lock-on. The system according to the present invention may be so arranged that insufficient negative feed-back occurs to accomplish this purpose, or the effect of the negative feed-back path may be to negate completely, or to overcompensate for, the boundary layer effect, everything else being equal. A valve V, in passage 12 permits control of negative feed-back. A further passage 15 communicates with the boundary layer region. This passage 15, optionally including therein a fluid resistance 16 in the form of a porous plug, terminates at one end in boundary layer region 10. The passage 15 terminates at its other end in a nozzle 18 adjacent to a flapper valve 17 in a region of relatively low static pressure. It then follows that when the flapper valve 17 completely closes the egress nozzle 18 of the passage 15, which communicates with the region of very low ambient static pressure, in relation to the static pressure in the passages 3 and 4, that the only forces acting on the boundary layer region 10 are those due to the stream itself in passing along the passageway 4 and those due to the feed-back path 12. In such case there may be effectively no boundary layer lock-on effect or a slight such effect, depending on the amount of feed-back introduced by the feed-back path 12. As, however, the flapper valve 17 uncovers the nozzle 18, fluid flow occurs from the boundary layer region 10 through the channel 15 to the region of low ambient static pressure, and in consequence a boundary layer lock-on effect is generated by the channel 15, as well as a transverse pressure gradient across the fluid stream. The amount of feed-back introduced by the feed-back channel 12 is insufficient to overcome this latter effect. Accordingly deflection of the main stream into channel 4, and lock-on, occur at a predetermined setting of the flapper valve 17. The latter may be controlled in various ways, such as by means of a thermostatic element. For example, the flapper valve 17 may be a bi-metallic element, of the continuously variable, or the snap action, type or may be controlled by linkages in response to movement of such elements or of various other mechanical devices, in manners known per se.

In operation, then, fluid ejected by the pump 1, due to its kinetic energy tends to flow along the passage 3, from nozzle N. With the nozzle 18 closed practically no fluid will be diverted along the passage 4, and such fluid as may be diverted has negligible effect on the operation of the system, since it cannot build up a low pressure region in the boundary layer region 10 due to negative feed-back effects produced by the channel 12. On the other hand, as the nozzle 18 is opened by the flapper valve 17, the region 10 attains a relatively low pressure, much lower than the static pressure present in the channel 3. Such static pressure may be considerably above ambient value at nozzle 18, due to load L. At least a portion of the main stream, originally present in channel 3 is then diverted into the channel 4, by the transverse pressure gradient existing across the main stream. Such flow tends to create lock-on at region 10. If the pressure in the boundary layer region 10 becomes sufficiently low, relative to static pressure in channels 3 or 4, as because the nozzle 18 is sufficiently opened, the entire power stream is diverted into the channel 4, where boundary layer effect causes it to lock onto the wall 8 and proceed wholly in the channel 4, except for such small portion of the stream as is diverted through the control channel 15.

For most purposes it is possible to dispense with the feed-back channel 12, since with the nozzle 18 completely covered by the flapper valve 17 practically no fluid from the main stream in the channel 3 will be diverted through the channel 4. The feed-back passage 12 is then required only for those designs which are found to be unstable, and present an easy way of eliminating such instability. The primary feature of FIGURE 1 relates to the controlled evacuation of air from the boundary layer region 10 by means of a controlled passage, as a device for deflection of a main stream of fluid differentially into two different passages, as 3 and 4. This requires that pressure in region 10 be always greater than ambient pressure at nozzle 18, which is feasible if loads L have high fluid resistance or include, pistons, diaphragms, or the like.

Figure 2:
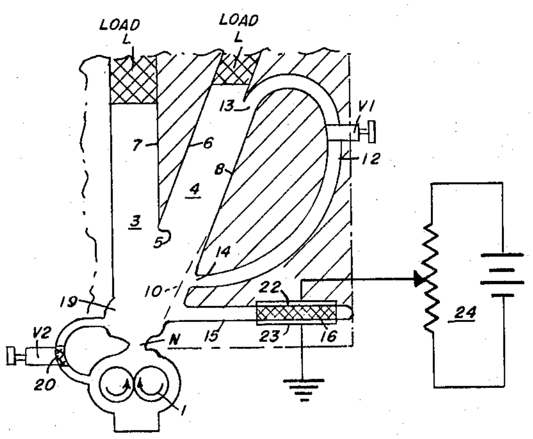
FIGURE 2 is a modification of the system of FIGURE 1 wherein the flapper valve of the system of FIGURE 1 is replaced by an electro-fluid resistance.

Referring now to FIGURE 2 of the accompanying drawings, this system is a duplicate of the system illustrated in FIGURE 1 except in that in FIGURE 2 the control channel 15 is provided with spaced electrodes along its entire length, these being identified by the reference numerals 22 and 23. Electrode 23 may be grounded and the electrode 22 connected to a source of variable voltage 24. The fluid resistance 16 may be included or omitted, depending on the design of the overall system.

The provision of a region of considerable length subjected to a transverse voltage gradient, between which suitable fluid must pass, constitutes an electro-fluid resistance, i.e. a fluid resistance subject to electrical control without the interposition of moving parts, and effectively replaces the flapper valve 17 in FIGURE 1. Gas, such as air, constitutes a suitable fluid.

In the system of FIGURES 1 and 2 the normal kinetic energy of the fluid stream, which tends to cause flow into channel 3, is sufficient to overcome the lock-on effect due to sufficiently lowered pressure in boundary layer region 10, until fluid resistance of the exit channel 15 has been sufficiently reduced to increase transverse pressure across the stream to a sufficient value. Transfer back from channel 4 to channel 3 then occurs when the lock-on effect is reduced sufficiently to enable the kinetic energy effect of the stream to govern. Where the load L in channel 3 does not effect build up of adequate static pressure in channel 3 to produce the transverse pressure gradient required to deflect the stream into channel 4 when flapper valve 17 opens nozzle 18, such pressure may be provided by a feed through via passage 25, extending from pump 1. This passage may include a control valve $V_2$, to control the magnitude of the gradient.

Figure 3:
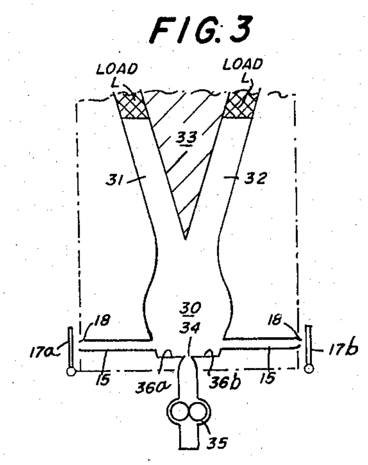
FIGURE 3 is a schematic representation of a fluid amplifier employing double flapper valves to control the pressure in boundary layer control regions.

In the system of FIGURE 3, double control channels *15a* and *15b* are provided, each having its own flapper valve, as *17a* and *17b*, the channels *15a* and *15b* being associated with an interaction chamber 30 from which issue a pair of output channels 31, 32, separated by a divider 33. The main fluid stream is projected from a power nozzle 34 which is connected with a source of pressure 35, the stream normally tending to divide equally between the passages. Offsets 36*a*, 36*b* are provided to generate boundary layer regions of reduced pressure when fluid flow occurs past the boundary layer regions. By manipulation of the flapper valves 17*a*, 17*b*, lock-on effect at one of the offsets 36*a*, 36*b* may be caused to predominate, whereupon the stream locks into one output channel or the other.

Figure 4:
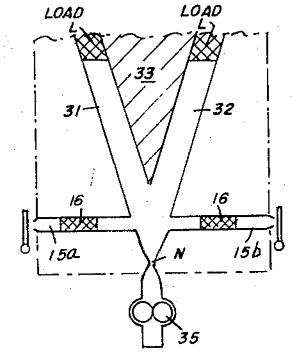

FIGURE 4 is an obvious modification of FIGURE 3, wherein the boundary layer configuration is dispensed with, no off-sets being utilized, i.e. in FIGURE 4 boundary layer effect is completely dispensed with and is replaced by low pressure regions introduced solely by the control channels, per se, when these are permitted to exit into a region of low ambient pressure.

Figure 5:
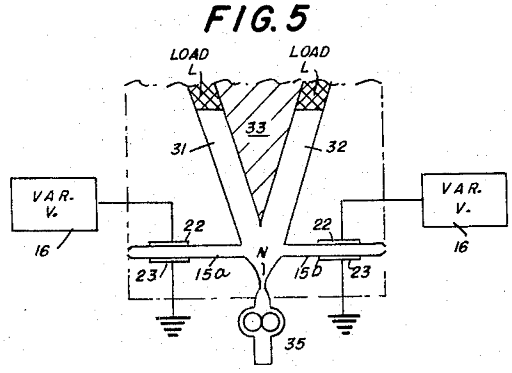
FIGURE 5 is a modification of the system of FIGURE 4 wherein the flapper valves of FIGURE 4 are replaced by electro-fluid resistances.

FIGURE 5 is a modification of FIGURE 4 wherein the flap valve control channels are replaced by fluid resistances of the electrically responsive type, the two systems being otherwise identical.

The system of FIGURE 1 can permit some degree of proportional flow as between the channels 3 and 4, i.e. it does not require that the stream flow in one of the channels only. Complete transfer and lock-on of the stream into channel 4 occurs suddenly, however, when the nozzle 18 is sufficiently uncovered, the action being analogous to that ocurring in an electronic flip-flop. Once complete lock-on has occurred, a slight movement of the flapper valve 17 toward the nozzle 18 will not be sufficient to remove the lock-on, since the latter is in part due to the motion of fluid in the channel 4. The system therefore tends to be stable, i.e. once lock-on has occurred within the channel 4, that lock-on tends to remain until the flapper valve 17 has moved to a position closer to the nozzle 18 than was the case when lock-on set in. Oscillation or instability of the system is thus prevented. What is true, in this respect, of the system of FIGURE 1 is likewise true of the system of FIGURE 2.

The basis for this capability is that the channel 3 is in direct line with the pump 1 so that fluid flow due to the kinetic energy of the fluid always tends to take place in channel 3, except insofar as a sufficiently powerful diverting force exists. The system tends to be monostable toward channel 3. In the system of FIGURE 3, bistable operation exist, since whenever the stream becomes stronger in one or the other of the channels, the stream itself provides a positive feed-back due to boundary layer action, and flips the direction of the stream completely into that stream wherein flow predominates. While FIGURE 3 provides a boundary layer configuration in terms of the presence of lock-on off-sets to produce lock-on, the system of FIGURE 4 is essentially different from that of FIGURE 3, in principle, because the system of FIGURE 4 does not utilize offsets. The system of FIGURE 4 is essentially a momentum interchange unit, high pressure on one side of the jet being created statically by load L and low pressure on the other side by a controlled passage leading to a region of low pressure. A pressure gradient thus exists transversely of the jet, which tends to cause a transverse flow of fluid across the jet, and thus to deflect the jet.

Momentum interchange, as described in the last preceding paragraph, is present in the embodiments of my invention illustrated in FIGURES 1–5, inclusive, but in FIGURES 1–3 boundary layer effects are also introduced, and the transverse pressure gradient region terminates in one or more boundary layer regions, pressure in which is directly controlled, as by a flapper valve.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A fluid device, comprising a passage, an offset in a wall of said passage arranged to provide a reduced fluid pressure offset region in response to flow of fluid along said passage, a control channel communicating with said offset region, said control channel communicating with a region of lower ambient pressure than is present in said offset region, and a variable fluid resistance in series with said control channel.

2. The combination according to claim 1 wherein said variable fluid resistance includes a flapper valve.

3. The combination according to claim 1 wherein said variable fluid resistance includes an electrical fluid resistance.

4. The combination according to claim 1 wherein is further provided a negative feed-back path between said passage and said offset region.

5. A fluid device, comprising a first passage, a second passage, said passages having a junction, a source of fluid under pressure communicating with said junction and normally directing fluid preponderantly toward one of said passages, the other of said passages having a configuration including a recess arranged to provide a region of low pressure, whereby said fluid has a tendency to flow in said second passage, and means for controlling said low pressure, said means for controlling including a fluid egress passage communicating with said recess.

6. The combination according to claim 5 wherein said fluid egress passage communicates with a region of relatively low ambient pressure, and wherein said means for controlling includes a flapper valve.

7. The combination according to claim 5 wherein said fluid control passage communicates with a region of relatively low ambient pressure, and wherein said means for controlling includes an electro-fluid valve.

8. A fluid operated device comprising a source of a stream of fluid, a reception region for said stream of fluid, means for reducing static pressure on one side of said stream, said means comprising an egress control passage for said fluid, said stream being deflectable toward said one side in response to a reduction of static pressure on said one side due to egress of fluid through said egress control passage.

9. A fluid operated device comprising a power nozzle, a source of fluid under pressure connected to said power nozzle, a pair of passages having origins adjacent said power nozzle, said fluid being ejected by said power nozzle in a stream directed generally in the direction of said origins, and means for relatively controlling flow of said stream differentially to said origins, said last means comprising fluid control passageways communicating with said stream on opposite sides thereof, said fluid control passageways communicating with a region of static pressure lower than the static pressure in said stream adjacent said control passageways.

10. The combination according to claim 9 wherein is provided an interaction chamber located between said power nozzle and said origins, said control passageways communicating with said interaction chamber.

11. The combination according to claim 9 wherein said power nozzle is arranged normally to direct said fluid equally toward said origins.

12. The combination according to claim 9 wherein said power nozzle is arranged normally to direct said fluid into one of said origins only.

13. The combination according to claim 12 wherein is provided a controllable fluid resistance in at least one of said passageways.

14. A fluid operated device comprising a power nozzle for generating a fluid stream, a source of fluid under pressure connected with said power nozzle, a pair of passages having origins adjacent to said power nozzle, said stream being diverted by said power nozzle generally toward said origins, and means for controlling flow of said stream differentially to said origins, said last means comprising a control passage communicating with a region of lower ambient pressure than is present in said stream adjacent the origin of said control passage.

15. The combination according to claim 14 wherein is provided boundary control devices for reducing pressure on one side of said stream in response to flow of said stream.

16. The combination according to claim 14 wherein said last means includes a flapper valve for controlling said control passage.

17. The combination according to claim 14 wherein said last means includes an electro-fluid resistance for controlling egress of fluid from said control passage.

18. A fluid operated device comprising a source of a stream of fluid, a reception region for said stream of fluid, means for reducing pressure on one side of said stream, said means comprising an egress control passage for said fluid, said stream being deflectable in response to a reduction of pressure on said one side due to egress of fluid through said egress control passage.

19. The combination according to claim 18 wherein is provided a positionable mechanical element positioned at said egress passage and controlling egress of said fluid as a function of position of said positionable mechanical element.

20. A fluid operated device comprising a source of a stream of fluid, a nozzle communicating with said source and forming a stream of said fluid flowing from said nozzle, means for developing a steady flow of fluid transversely of said last-named stream of fluid in response to fluid flow from said source, an egress passage for said fluid extending transversely of said last named stream of fluid and in communication with said last-named stream of fluid, and a variable fluid resistance controlling egress of said fluid from said egress passage.

21. The combination according to claim 20 wherein said fluid resistance includes a movable solid object located adjacent to said egress passage.

No references cited.